(12) United States Patent
Hwang

(10) Patent No.: US 10,503,638 B2
(45) Date of Patent: Dec. 10, 2019

(54) METHOD OF ACCESSING STORAGE DEVICE INCLUDING NONVOLATILE MEMORY DEVICE AND CONTROLLER

(71) Applicant: JooYoung Hwang, Suwon-si (KR)

(72) Inventor: JooYoung Hwang, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 136 days.

(21) Appl. No.: 15/454,542

(22) Filed: Mar. 9, 2017

(65) Prior Publication Data

US 2017/0308464 A1   Oct. 26, 2017

(30) Foreign Application Priority Data

Apr. 21, 2016   (KR) .................. 10-2016-0048759

(51) Int. Cl.
```
G06F 11/00      (2006.01)
G06F 12/06      (2006.01)
G06F 11/14      (2006.01)
G06F 3/06       (2006.01)
G06F 12/1009    (2016.01)
G06F 12/02      (2006.01)
```
(52) U.S. Cl.
CPC .......... *G06F 12/0692* (2013.01); *G06F 3/061* (2013.01); *G06F 3/064* (2013.01); *G06F 3/0604* (2013.01); *G06F 3/0643* (2013.01); *G06F 3/0679* (2013.01); *G06F 3/0688* (2013.01); *G06F 11/14* (2013.01); *G06F 11/1451* (2013.01); *G06F 11/1471* (2013.01); *G06F 12/0246* (2013.01); *G06F 12/1009* (2013.01); *G06F 2201/80* (2013.01); *G06F 2201/805* (2013.01); *G06F 2201/82* (2013.01); *G06F 2212/1032* (2013.01); *G06F 2212/202* (2013.01); *G06F 2212/65* (2013.01)

(58) Field of Classification Search
CPC .......................... G06F 11/1471; G06F 11/079
See application file for complete search history.

(56) References Cited

U.S. PATENT DOCUMENTS

| | | | |
|---|---|---|---|
| 6,721,767 B2 * | 4/2004 | De Meno | G06F 11/1448 707/684 |
| 6,892,211 B2 | 5/2005 | Hitz et al. | |
| 7,679,133 B2 | 3/2010 | Son et al. | |
| 8,200,889 B2 | 6/2012 | Kwon et al. | |
| 8,332,688 B1 * | 12/2012 | Tompkins | G06F 11/1438 714/13 |
| 8,341,336 B2 | 12/2012 | Chang et al. | |
| 8,553,466 B2 | 10/2013 | Han et al. | |

(Continued)

*Primary Examiner* — Marc Duncan
*Assistant Examiner* — Jonathan D Gibson
(74) *Attorney, Agent, or Firm* — Harness, Dickey & Pierce, P.L.C.

(57) ABSTRACT

Aspects of the inventive concept relates to a method of accessing a storage device including a nonvolatile memory device and a controller. The method includes writing user data, a first logical address and a second logical address associated with the user data in a storage space corresponding to the first logical address of the nonvolatile memory device. The user data is update data that updates previous data written in the nonvolatile memory device. The second logical address is a logical address of a storage space of the nonvolatile memory device in which the previous data is written.

18 Claims, 15 Drawing Sheets

(56) References Cited

U.S. PATENT DOCUMENTS

| | | |
|---|---|---|
| 8,559,235 B2 | 10/2013 | Yoon et al. |
| 8,654,587 B2 | 2/2014 | Yoon et al. |
| 8,719,540 B1* | 5/2014 | Miller .................... G06F 3/0619 |
| | | 711/173 |
| 9,021,187 B2 | 4/2015 | Sela et al. |
| 9,152,556 B2 | 10/2015 | Olbrich et al. |
| 9,542,430 B1* | 1/2017 | Fitterer ............. G06F 17/30952 |
| 9,817,588 B2* | 11/2017 | Chang .................. G06F 3/0619 |
| 9,830,257 B1* | 11/2017 | Booth ................. G06F 12/0246 |
| 2004/0260678 A1* | 12/2004 | Verbowski ........... G06F 11/008 |
| 2006/0168392 A1 | 7/2006 | Hwang |
| 2007/0239728 A1* | 10/2007 | Smits .................. G06F 11/1438 |
| 2008/0195773 A1* | 8/2008 | Concilio ................ G06F 9/466 |
| | | 710/56 |
| 2009/0300416 A1* | 12/2009 | Watanabe ........... G06F 11/1461 |
| | | 714/19 |
| 2011/0233648 A1 | 9/2011 | Seol et al. |
| 2012/0221884 A1* | 8/2012 | Carter ................. G06F 11/0772 |
| | | 714/2 |
| 2013/0166828 A1 | 6/2013 | Chun |
| 2013/0275692 A1 | 10/2013 | Kwok |
| 2013/0332656 A1 | 12/2013 | Kandiraju et al. |
| 2014/0095437 A1 | 4/2014 | Hwang et al. |
| 2014/0095772 A1 | 4/2014 | Lee et al. |
| 2014/0130036 A1* | 5/2014 | Gurikar .................... G06F 8/61 |
| | | 717/176 |
| 2015/0039815 A1 | 2/2015 | Klein |
| 2015/0052395 A1* | 2/2015 | Wipfel ................ G06F 11/1451 |
| | | 714/19 |
| 2015/0212938 A1 | 7/2015 | Chen et al. |
| 2015/0332772 A1* | 11/2015 | Kim ........................ G11C 16/32 |
| | | 365/185.22 |
| 2016/0299710 A1* | 10/2016 | Chang .................. G06F 3/0619 |
| 2017/0124141 A1* | 5/2017 | Munir ............... G06F 17/30377 |
| 2017/0255564 A1* | 9/2017 | Kitsunai ............. G06F 12/0246 |

\* cited by examiner

FIG. 14
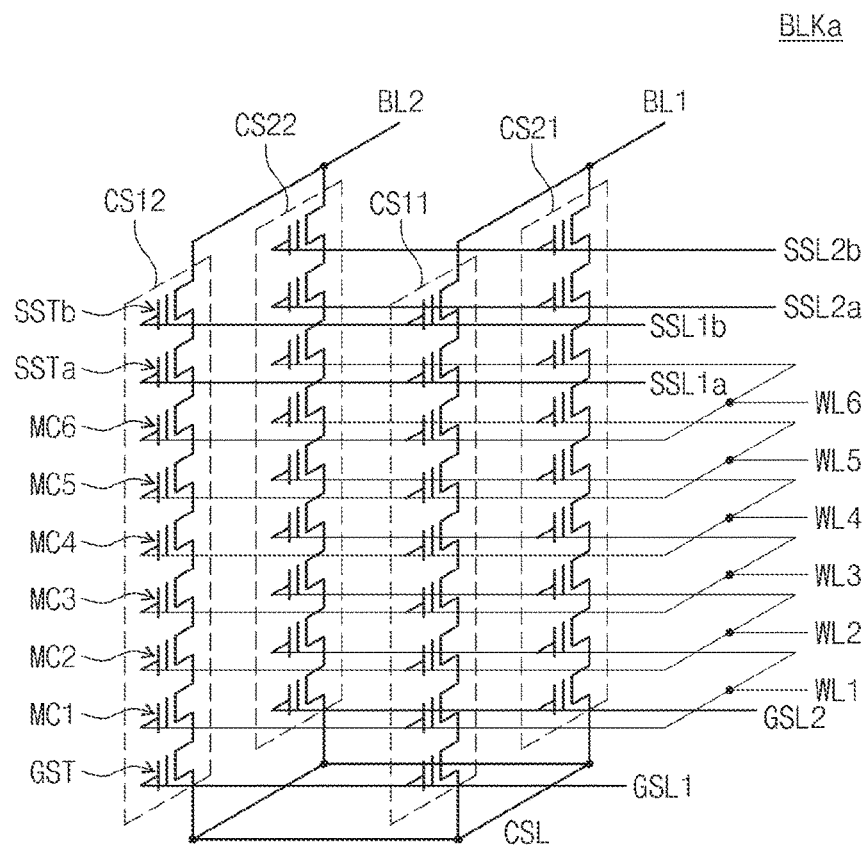
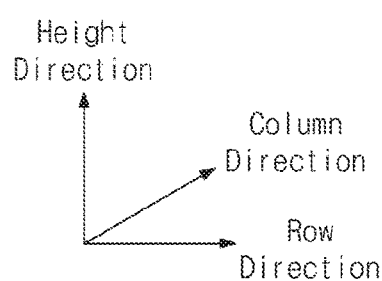

METHOD OF ACCESSING STORAGE DEVICE INCLUDING NONVOLATILE MEMORY DEVICE AND CONTROLLER

CROSS-REFERENCE TO RELATED APPLICATIONS

This U.S. non-provisional patent application claims priority under 35 U.S.C. § 119 of Korean Patent Application No. 10-2016-0048759, filed on Apr. 21, 2016, the entire contents of which are hereby incorporated by reference.

BACKGROUND

The inventive concepts relate to electronic circuits, and more particularly, to a method of accessing a storage device including a nonvolatile memory device and a controller.

A computing device includes a desktop computer, a notebook computer, a smart phone, a smart tablet, etc. A hard disk driver has traditionally been used as a storage device. However, a mobile device such as a smart phone, a smart tablet, etc. uses a nonvolatile memory device such as a NAND flash memory, a phase-change RAM (PRAM), a magnetic RAM (MRAM), a resistive RAM (RRAM), a ferroelectric RAM (FRAM), etc. as a storage device. A frequency of using a nonvolatile memory device as a storage device even in a notebook computer and a desktop computer is on the increase.

A nonvolatile memory device has a comparatively short history as compared with a hard disk driver. Thus, most of existing file systems that manage a storage device is designed to fit an operating characteristic of a hard disk drive. Due to a difference of an operating characteristic between a nonvolatile memory device and a hard disk driver, these existing file systems cannot make full use of operation performance of the nonvolatile memory device. Thus, a study on a method of accessing new file systems (e.g., a storage device) capable of making full use of operation performance of the nonvolatile memory device is urgently needed.

SUMMARY

Example embodiments of the inventive concepts provide a method of accessing a storage device including a nonvolatile memory device and a controller. The method may include writing user data, a first logical address and a second logical address associated with the user data in a storage space corresponding to the first logical address of the nonvolatile memory device. The user data is update data that updates previous data written in the nonvolatile memory device. The second logical address is a logical address of a storage space of the nonvolatile memory device in which the previous data is written.

Example embodiments of the inventive concepts also provide a method of accessing a storage device. The method may include allocating, by a host device, a continuous storage space corresponding to continuous logical addresses in the storage device, writing, by the host device, sequentially user data in the continuous storage space in the order of the continuous logical addresses together with a first logical address indicating the continuous storage space and second logical addresses in which the user data is previously written, and when sudden power off of the storage device is detected, restoring, by the host device, a file system using meta data backed up in the storage device and the first and second logical addresses.

BRIEF DESCRIPTION OF THE FIGURES

Embodiments of the inventive concepts will be described below in more detail with reference to the accompanying drawings.

FIG. 14 is a circuit diagram illustrating a memory block according to example embodiments of the inventive concept.

DETAILED DESCRIPTION

Figure 1:
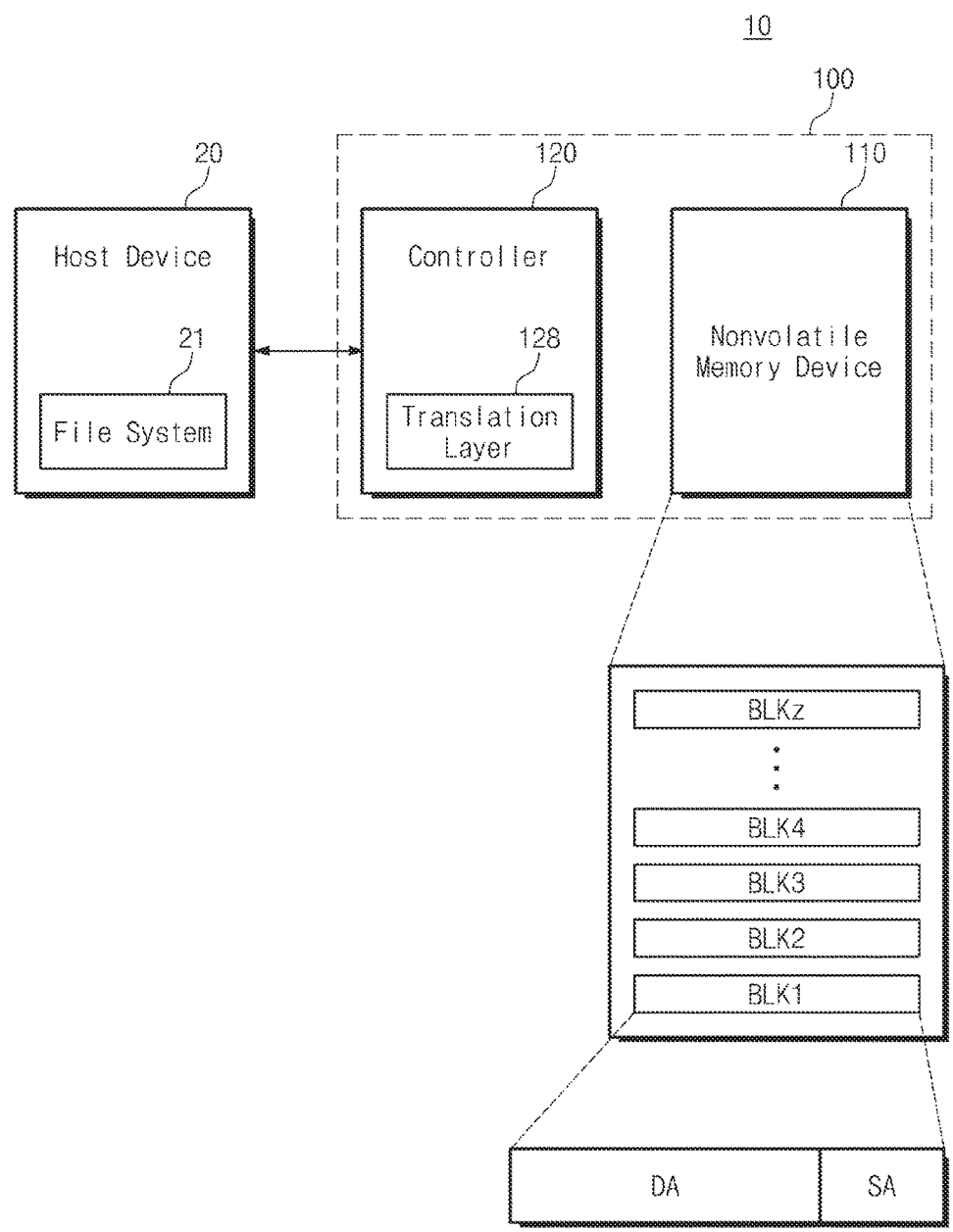
FIG. 1 is a block diagram illustrating a computing device according to example embodiments of the inventive concept.

FIG. 1 is a block diagram illustrating a computing device according to example embodiments of the inventive concept. Referring to FIG. 1, a computing device 10 includes a host device 20 and a storage device 100.

The host device 20 may access the storage device 100. The host device 20 may write user data in the storage device 100 and may read user data written in the storage device 100. The host device 20 may operate a file system 21 that manages a storage space of the storage device 100. The file system 21 may be provided as a part of an operating system being driven in the host device 20. Using the file system 21, the host device 20 may manage the storage space of the storage device 100, write user data in the storage device 100, and read user data from the storage device 100.

The storage device 100 may include a nonvolatile memory device 110 and a controller 120. The controller 120 may communicate with the host device 20. The controller 120 may control the nonvolatile memory device 110 according to a request of the host device 20. The controller 120 may write data (e.g., user data or meta data) received from the host device 20 in the nonvolatile memory device 110. The controller 120 may read data (e.g., user data or meta data) from the nonvolatile memory device 110 and transfer the read data to the host device 20.

The controller 120 includes a translation layer 128. The translation layer 128 may be firmware or software driven by the controller 120. The translation layer 128 may translate a logical address of a storage space managed by the host device 20 into a physical address of a storage space of the nonvolatile memory device 110. The controller 120 may translate a logical address of a logical address-based request received from the host device 20 into a physical address using the translation layer 128. The controller 120 may transmit a physical address-based request to the nonvolatile memory device 110. The translation layer 128 may manage the nonvolatile memory device 110 and perform various background operations for improving operation performance of the nonvolatile memory device 110.

The user data and the meta data are defined below. The user data may be data written in the storage device 100 or the nonvolatile memory device 110 by a user using the host device 20. The user data may include various data such as data of an operating system or application installed in the computing device 10, a word file, a spreadsheet file, a multimedia file, and a compressed file, etc. generated by the operating system or the application. The meta data may be data which the host device 20 generates to manage the storage device 100. The meta data may include data of the file system 21 corresponding to the storage device 20. The meta data may be written in the storage device 100 or the nonvolatile memory device 110 by the host device 20 or the file system 21 without user intervention so that it is maintained even when power is turned off.

The controller 120 may generate meta data for managing the nonvolatile memory device 110 and write the meta data in the nonvolatile memory device 110. For brevity of description, the meta data that will be described later is interpreted to designate things generated or managed by the host device 20 or the file system 21. However, a technical sprit of the inventive concepts is not limited thereto.

The nonvolatile memory device 110 includes a plurality of memory blocks (BLK1~BLKz). Each of the memory blocks (BLK1~BLKz) includes a plurality of memory cells. Memory cells of each memory block may form a storage space of each memory block. A storage space of each memory block may include a data area DA and a spare area SA. The data area DA may form a storage space identified (or addressed) and accessed by the host device 20. The spare area SA may form a storage space not identified (or addressed) by the host device 20 and independently managed by the controller 120.

Figure 2:
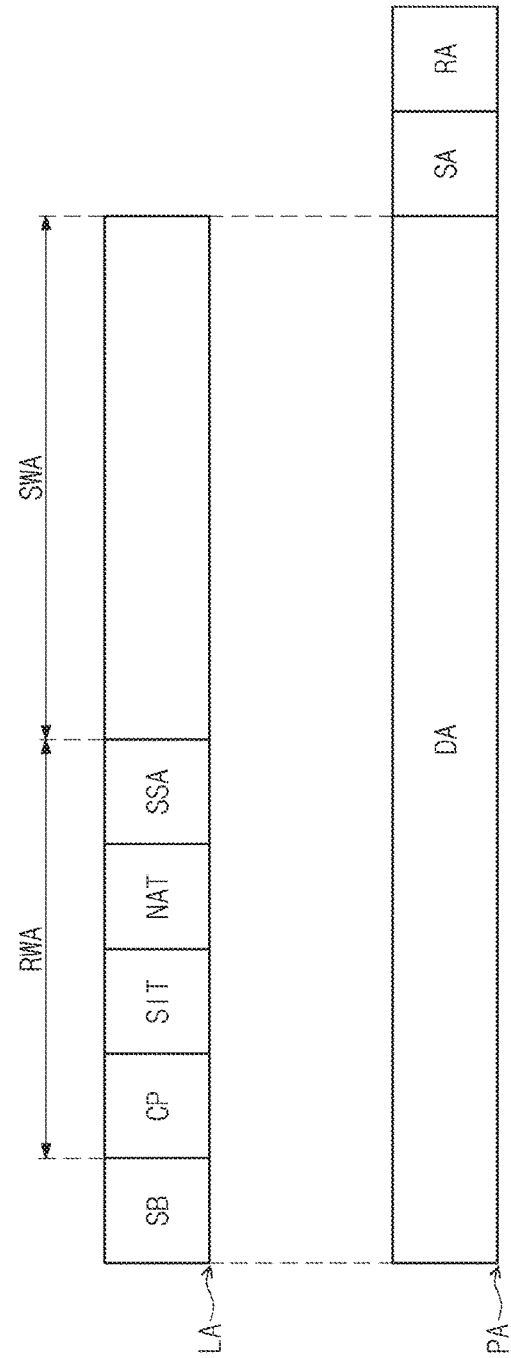
FIG. 2 illustrates a physical storage space of a storage device or a nonvolatile memory device and a logical storage space identified by a host device.

FIG. 2 illustrates a physical storage space PA of a storage device or a nonvolatile memory device and a logical storage space LA identified by a host device. Referring to FIGS. 1 and 2, the host device 20 may identify the data area DA in the physical storage space PA of the storage device 100 as the logical storage space LA. A spare area SA and a reserve area RA in the physical storage space PA may not be identified by the host device 20 and may not be included in the logical storage space LA. The reserve area RA may include a memory block used when the controller 120 stores meta data generated by the controller 120. The reserve area RA may include a memory block which the controller 120 internally uses to replace a bad block or to use in a background operation like a garbage collection.

Since the spare area SA and the reserve area RA in the physical storage space PA are not included in the logical storage space LA, a range of a physical address that identifies the physical storage space PA may be greater than a range of a logical address that identifies the logical storage space LA.

The host device 20 may access the logical storage space LA in units of blocks. The host device 20 may request the storage device 100 to write data of one block when one write request occurs. The host device 20 may also request the storage device 100 to read data of one block when one write request occurs. For example, one block may be 4 KB.

The host device 20 may set segments in the logical storage space LA. A size of each segment may be set to include two or more blocks. For example, one segment may be 2 MB.

The host device 20 may set sections in the logical storage space LA. The size of each section may be set to include two or more segments. A size of each section may be set to coincide with a unit of a garbage collection in the storage device 100. A size of a minimum storage space obtained through a garbage collection in the storage device 100 may be the same as a size of one section.

The host device 20 may set zones in the logical storage space LA. A size of each zone may be set to match a size of each section or to include two or more sections.

The host device 20 may write a super block SB in the logical storage space LA. The super block SB may be meta data including partition information of the logical storage space LA. The super block SB may be generated when the logical storage space LA is formatted and an update of the super block SB through the writing other than format may be prohibited.

The host device 20 may divide the logical storage space LA, exclusive of a space in which the super block SB is written into a random write area RWA and a sequential write area SWA. The host device 20 may perform a random write of a block unit in the random write area RWA. The host device 20 may perform a sequential write in each section of the sequential write area SWA.

The host device 20 may write meta data in the random write area RWA and write user data and log information of the user data in the sequential write area SWA.

Meta data written in the random write area RWA by the host device 20 may include a check point CP, a segment information table SIT, a node address table NAT, and a segment summary area SSA.

The check point CP may include bit maps indicating a state of the file system 21, the node address table NAT and effective information of the segment information table SIT, and a summary entry of a current active segment (or section).

The segment information table SIT may include bit maps with respect to the number of effective blocks of each segment of the sequential write area SWA and validity of all the blocks. The node address table NAT may be a table indicating locations (e.g., logical addresses) associated with all the node blocks stored in the sequential write area SWA. The segment summary area SSA may include possessed information (e.g., the number of parent nodes and offsets) of all the blocks of the sequential write area SWA. The check point CP, the segment information table SIT, the node address table NAT, and the segment summary area SSA may form meta data managed by the file system 21 that manages the logical storage space LA.

In the sequential write area SWA, the host device 20 may write user data in a data block and write log information in a node block. The random write area RWA and the sequential write area SWA may be divided at a boundary of a section or a zone.

The node address table NAT may be used to support the host device 20 to access the sequential write area SWA. The check point CP, the segment information table SIT, and the segment summary area SSA may be used to restore meta data and the file system 21 when sudden power off occurs. The segment information table SIT and the segment summary area SSA may be used to select a section in which the host device 20 will perform a garbage collection.

Figure 3:
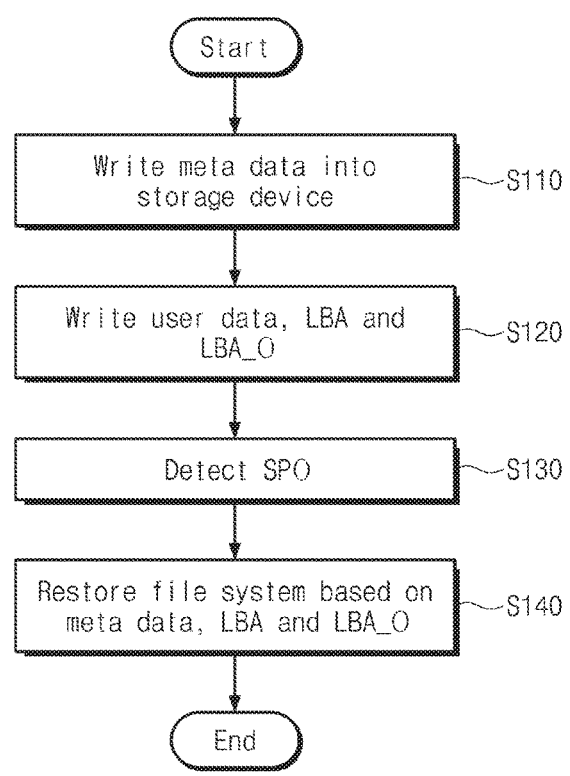
FIG. 3 is a flowchart illustrating a method in which a host device accesses a storage device according to example embodiments of the inventive concept.

FIG. 3 is a flowchart illustrating a method in which the host device 20 accesses the storage device 100 according to example embodiments of the inventive concept. Referring to FIGS. 1 through 3, in an operation S110, the host device 20 may write meta data in the random write area RWA of the storage device 100.

In an operation S120, the host device 20 may write user data, a logical address LBA of a logical storage space LA in which user data is written, and a previous logical address LBA_O in the sequential write area SWA of the storage device 100.

The file system 21 may operate in a copy-on-write way. When writing new user data in the storage device 100, the file system 21 may select a logical address of a free storage space and write the new user data in the storage device 100 using the selected logical address. When updating existing data written in the storage device 100, the file system 21 may select a logical address of the free storage space and write the updated data in the storage device 100 using the selected logical address. The file system 21 may release the storage space in which the previous data is stored into a free storage space.

When the user data is updated data, the previous logical address LBA_O may correspond to the storage space in which the previous data is stored. When the user data is not updated data but new data, the previous logical address LBA_O may indicate a null value or a predetermined, or designated, value.

In an operation S130, the host device 20 may detect that sudden power off (SPO) occurs in the storage device 100. In the case where the storage device 100 is separated from the host device 20 without notice or power being supplied to the computing device 10 is shut off without notice, sudden power off (SPO) may occur in the storage device 100.

When sudden power off (SPO) occurs, the storage device 100 may write information indicating that sudden power off occurs in a predetermined, or designated, location using an internal standby power. The host device 20 may detect that sudden power off occurs in the storage device 100 by detecting information written by the storage device 100.

When power off normally occurs, the storage device 100 may write information indicating that normal power off occurs in a predetermined, or designated, location. The host device 20 may detect that sudden power off occurs in the storage device 100 by detecting that the storage device 100 does not write information.

The methods described above are merely an example. A method in which the host device 20 detects sudden power off of the storage device 100 may be variously changed or applied.

In an operation S140, the host device 20 may restore the file system 21 based on meta data, the logical address LBA, and the previous logical address LBA_O that are stored in the storage device 100.

When the host device 20 writes data in the storage device 100, an update of the meta data occurs. The update of the meta data is internally performed in the host device 20 and when power is shut off in the computing device 10, the updated meta data is lost. To prevent the updated meta data from being lost, the host device 20 has to write meta data in the storage device 100.

According to example embodiments of the inventive concept, meta data may not be immediately written in the storage device 100 after user data is written in the storage device 100. That is, after meta data is stored in the nonvolatile memory device 110 (S110), second user data may be written in the storage device 100 (S120) and meta data updated by the writing of the second user data may not be immediately written in the storage device 100. Although updated meta data not written in the storage device 100 is lost by sudden power off (S130), the file system 21 may be restored using the meta data which is previously written, the logical address LBA written together with the second user data, and the previous logical address LBA_O. Since even though the latest meta data is not written in the storage device 100, it is possible to restore the file system 21, the frequency in which the host device 20 writes the meta data in the storage device 100 may be reduced. The number of times of writing with respect to the nonvolatile memory device 110 is reduced, lifespan of the storage device 100 is extended, and a speed of the storage device 100 is improved.

Figure 4:
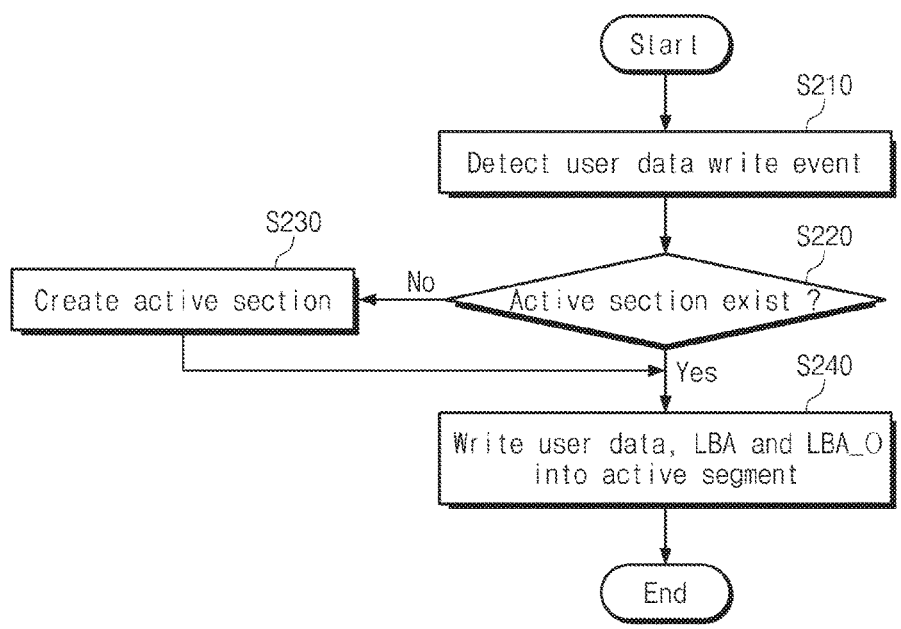
FIG. 4 is a flowchart illustrating a method in which a host device writes user data in a storage device.

FIG. 4 is a flowchart illustrating a method in which the host device 20 writes user data in the storage device 100. Referring to FIGS. 1, 2 and 4, in an operation S210, the host device 20 or the file system 21 may detect a write event of user data. When user data has to be written in the storage device 100 by a request of a user or when the user data is autonomously written in the storage device 100 in an operating system or an application driven by the host device, a write event of the user data may be detected.

In an operation S220, the host device 20 or the file system 21 determines whether an active section exists in the sequential write area SWA. The active section is opened for the writing of user data and may be a section including a free segment or a free block in which the user data will be written. When the active section does not exist, in an operation S230, the file system 21 may generate a free section of the sequential write area SWA as the active section.

When the active section exists or after the active section is generated, in an operation S240, the host device 20 or the file system 21 may write user data corresponding to the write event, the logical address LBA in which the user data will be written, and the previous logical address LBA_O associated with the user data in the active section.

The sequential write area SWA is configured to guarantee a sequential write inside the section. Thus, the file system 21, in the order of from the lowest (or highest) logical address in the active section to the highest (or lowest) logical address in the active section, may select a logical address of a first free block (e.g., data block) of a first active segment as a logical address LBA in which the user data will be written.

In the case where the user data is updated data, the previous logical address LBA_O may be a logical address of a block (e.g., data block) in which previous data corresponding to the updated data is stored. In the case where the user data is not updated data, the previous logical address LBA_O may include a value indicating that a null value or the previous logical address LBA_O is invalidated.

Figure 5:
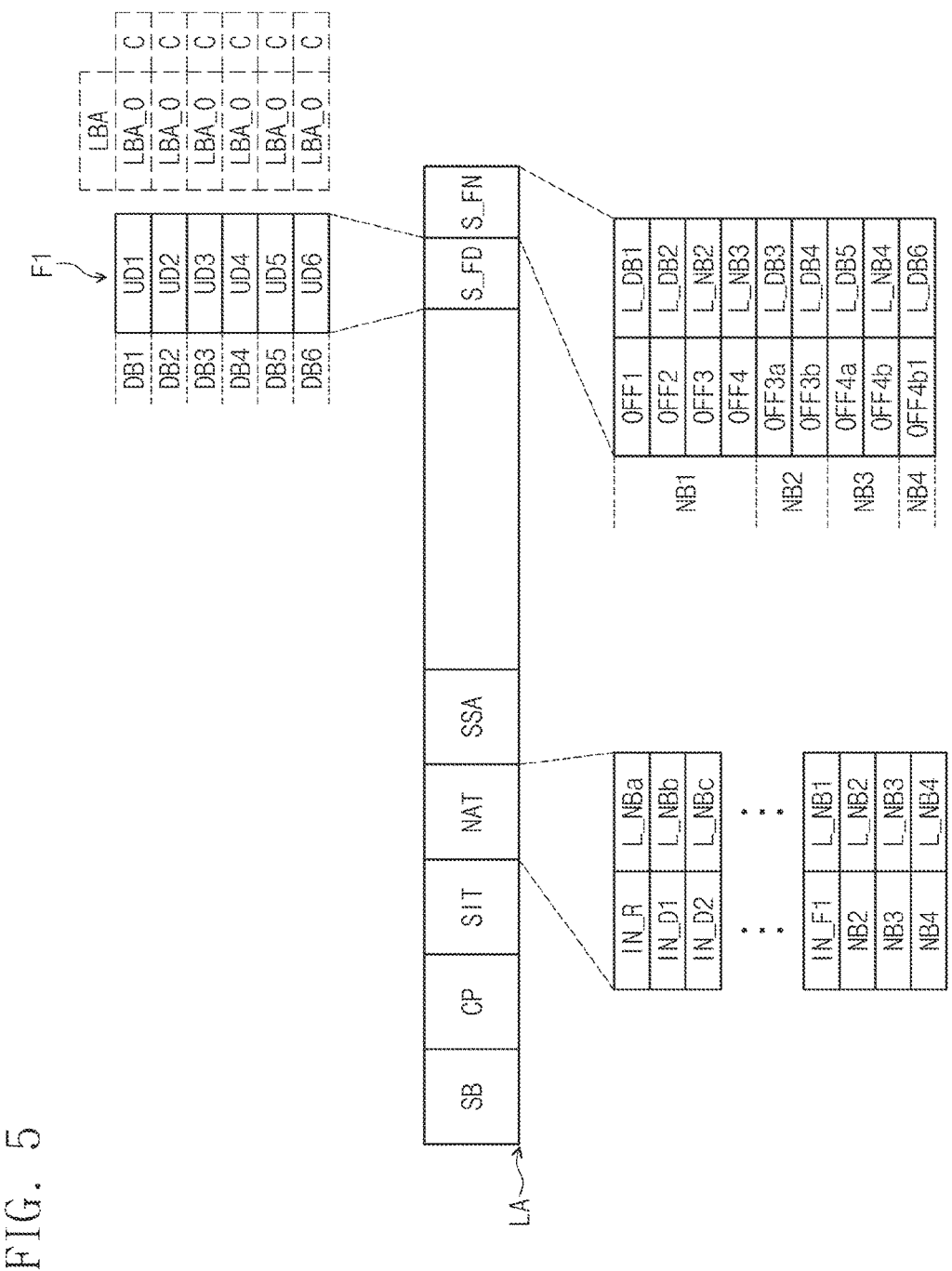
FIG. 5 is a block diagram illustrating a state in which user data is written based on a file system in a logical storage space identified by a host device.

FIG. 5 is a block diagram illustrating a state in which user data is written based on the file system 21 in the logical storage space LA identified by the host device 20. For brevity of description, reference texts of the random write area RWA and the sequential write area SWA illustrated in FIG. 2 are not illustrated in FIG. 5.

Referring to FIGS. 1 and 5, in the sequential write area SWA, the file system 21 may manage a file data section S_FD in which a file of user data is written and a file node section S_FN in which log information of a file written in a data section S_D is written in pairs. The file system 21 may write data block in the file data section S_FD and write node block in the file node section S_FN.

A node address table NAT may include information about locations (e.g., logical addresses) of all the node blocks written in the sequential write area SWA.

For example, the node address table NAT may include information about locations of node blocks of inodes written in the sequential write area SWA such as a location information L_NBa of an a node block (NBa, not illustrated) in which information of a root directory inode IN_R of a root directory (R, not illustrated) is written, b location information L_NBb of a b node block (NBb, not illustrated) in which information of a first directory inode IN_D1 of a first directory (D1, not illustrated) is written, and c location information L_NBc of a c node block (NBc, not illustrated) in which information of a second directory inode IN_D2 of a second directory (D2, not illustrated) is written.

The node address table NAT may further include first node location information L_NB1 of a first node block NB1 in which information of a first file inode IN_F1 of a first file (F1, not illustrated) written in the file data section S_FD and the file node section S_FN. When the host device 20 accesses the first file (F1, not illustrated) written in the file data section S_FD and the file node section S_FN, the host device 20 may detect the first node location information L_NB1 corresponding to the first file inode IN_F1 in the node address table NAT.

When the first node location information L_NB1 is detected, the first node block NB1 written in the file node section S_FN may be accessed. The first node block NB1 includes information about first through fourth file offsets OFF1 to OFF4. The first node block NB1 may include first data location information L_DB1 of a first data block DB1 corresponding to the first file offset OFF1. The first node block NB1 may include second data location information L_DB2 of a second data block DB2 corresponding to the second file offset OFF2.

The first node block NB1 may include second node location information L_NB2 of a second node block NB2 corresponding to the third file offset OFF3. When the third file offset OFF3 is accessed, the second node location information L_NB2 of the second node block NB2 may be detected with reference to the node address table NAT. The second node block NB2 may be accessed based on the second node location information L_NB2. The second node location information L_NB2 may include third data location information L_DB3 of a third data block DB3 corresponding to a 3a file offset OFF3a. The second node block NB2 may include fourth data location information L_DB4 of a fourth data block DB4 corresponding to a 3b file offset OFF3b.

The first node block NB1 may include third node location information L_NB3 of a third node block NB3 corresponding to a 4 file offset OFF4. When the fourth file offset OFF4 is accessed, the third node location information L_NB3 of the third node block NB3 may be detected with reference to the node address table NAT. The third node block NB3 may be accessed based on the third node location information L_NB3. The third node location information L_NB3 may include fifth data location information L_DB5 of a fifth data block DB5 corresponding to a 4a file offset OFF4a. The third node block NB3 may include fourth node location information L_NB4 of a fourth node block NB4 corresponding to a 4b file offset OFF4b.

The file data section S_FD may store user data UD1 to UD6 as first through sixth data blocks DB1 to DB6 corresponding to node blocks of the file node section S_FN. In the file data section S_FD, the user data UD1 to UD6 may be sequentially written according to an order of event occurrence as the first through sixth data blocks DB1 to DB6. In the file data section S_FD, corresponding log information may be sequentially written while the first through sixth data blocks DB1 to DB6 are sequentially written.

As described with reference to FIGS. 1 through 4, the previous logical addresses LBA_O may be further written. In the file data section S_FD, the previous logical addresses LBA_O may be written in every data block. For example, the previous logical addresses LBA_O may be written in the spare area SA of the nonvolatile memory device 110.

The logical address LBA may be further written. In each file data section S_FD, a beginning or ending logical address may be written once. The logical address LBA may be written in the spare area SA of the nonvolatile memory device 110.

A clean mark C may be further written with respect to each node block of the file data section S_FD. While the file data section S_FD and the file node section S_FN are generated, the segment information table SIT, the node address table NAT, and the segment summary area SSA may be updated. That is, meta data may be updated. When an updated part of the meta data associated with log information written in the file node section (S_FN) as a node block is written in the storage device 100, the clean mark C may be written. The clean mark C may be written in the spare area SA of the nonvolatile memory device 110. In FIG. 5, since the clean mark C is written in all data blocks of the file data section S_FD, an updated part of the meta data that occurs according to the writing of the data blocks DB1 to DB6 written in the file data section S_FD may be written in the storage device 100. When the updated part of the meta data is written in the storage device 100, the check point CP may also be updated and a check point for roll-back may be generated.

In FIG. 5, there is illustrated that the previous logical addresses LBA_O, the logical address LBA, and the clean marks C are written in the file data section S_FD. However, the previous logical addresses LBA_O, the logical address LBA, and the clean marks C may be written in the file data section S_FD or the file node section S_FN.

Figure 6:
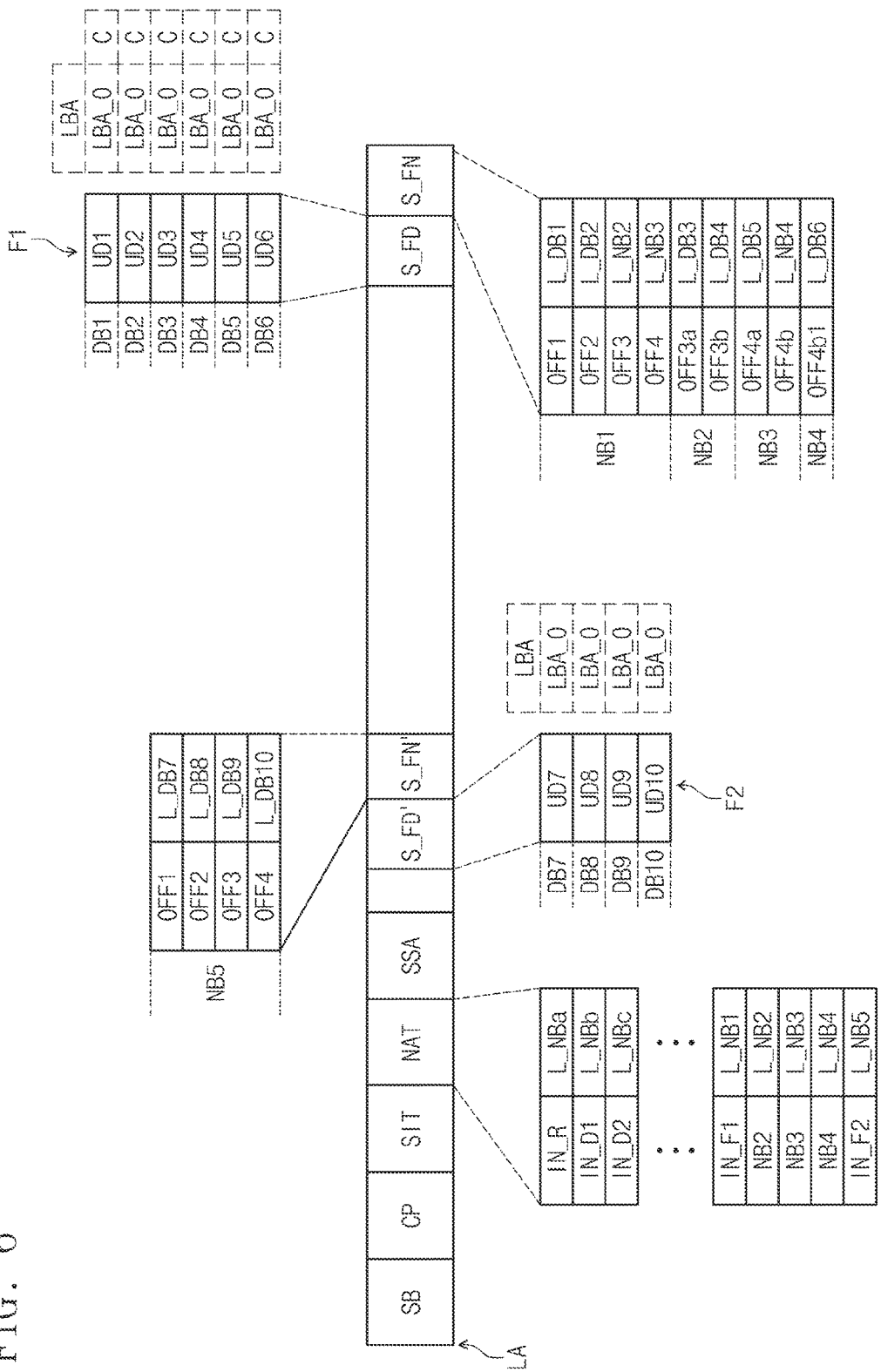
FIG. 6 illustrates an example where data is further written in the logical storage area of FIG. 5.

FIG. 6 illustrates an example where data is further written in the logical storage area LA of FIG. 5. As compared with FIG. 5, in FIG. 6, user data UD7 to UD10 corresponding to a second file F2 may be written in the file data section S_FD' as seventh through tenth data blocks DB7 to DB10. The seventh through tenth data blocks DB7 to DB10 may be written in a storage space of the storage device 100 corresponding to the file data section S_FD'. As the seventh through tenth data blocks DB7 to DB10 are written, log information corresponding thereto may be written in a file node section S_FN' as a fifth node block NB5. The fifth node block NB5 may be written in a storage space corresponding to the file node section S_FN'. The fifth node block NB5 may include seventh data location information L_DB7 of a seventh data block DB7 in which data of a first offset OFF1 of the second file F2 is written, eighth data location information L_DB8 of an eighth data block DB8 in which data of the second offset OFF2 is written, ninth data location information L_DB9 of a ninth data block DB9 in which data of the third offset OFF3 is written, and tenth data location information L_DB10 of a tenth data block DB10 in which data of the fourth offset OFF4 is written.

As the fifth node block NB5 is written in the file node section S_FN', the node address table NAT may be updated to further include the fifth node location information L_NB5 of the fifth node block NB5 corresponding to a second file inode IN_F2 of the second file F2. The segment information table SIT and the segment summary area SSA may also be updated. Since the clean mark C is not written in the seventh through tenth data blocks DB7 to DB10, an updated part of meta data that occurs according to the writing of the seventh through tenth data blocks DB7 to DB10 is not written in the storage device 100 and is managed only in the file system 21 of the host device 20. When sudden power off occurs in a state in which an updated part of the meta data is not written in the storage device 100, the updated part of the meta data may be lost. Although the updated part of the meta data is lost, the computing device 10 may restore the updated part of the meta data using the previous logical address LBA_O written in the storage device 100, the logical address LBA, and the meta data or a check point CP which is written in the storage device 100 and of which the updated part is not reflected. The latest meta data which is lost by the sudden power off may be restored.

Figure 7:
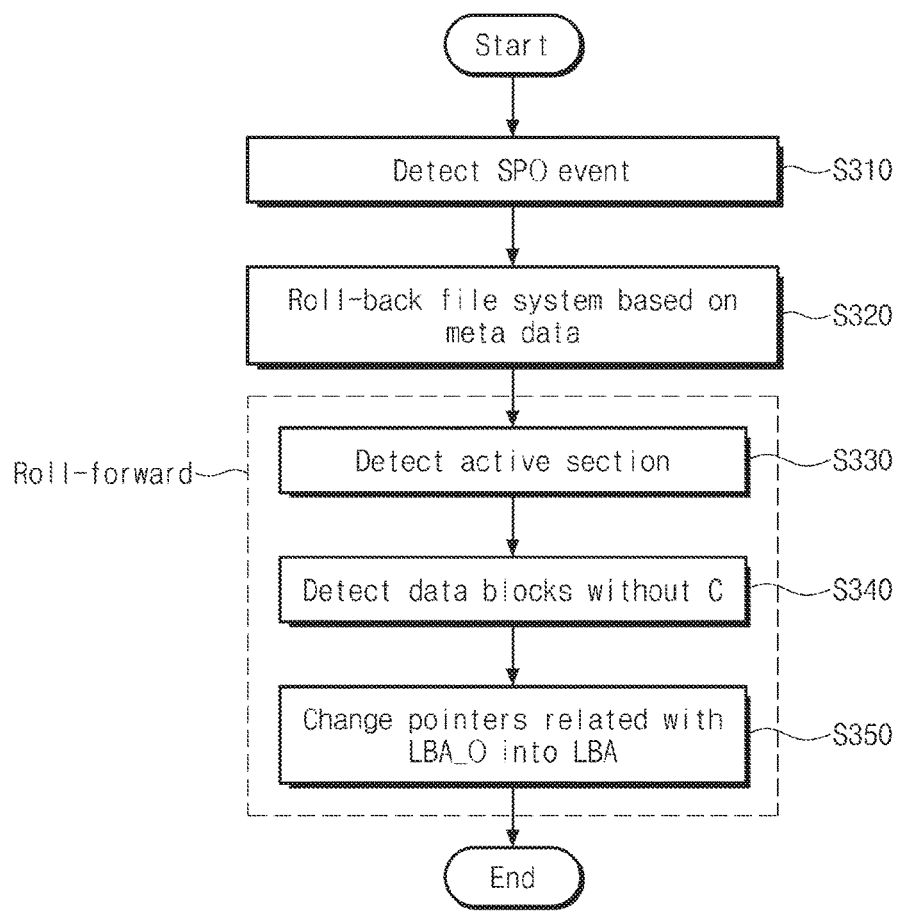
FIG. 7 illustrates an example where a computing device according to example embodiments of the inventive concepts restores meta data from a sudden power off.

FIG. 7 illustrates an example where a computing device 10 according to example embodiments of the inventive concepts restores meta data from a sudden power off. Referring to FIGS. 1, 5, 6 and 7, in an operation S310, the host device 20 may detect that sudden power off (SPO) occurs in the storage device 100. Methods of detecting the sudden power off (SPO) were described with reference to the operation S130 of FIG. 3 and thus a description thereof is omitted.

In an operation S320, the host device 20 or the file system 21 may roll back a file system based on meta data. The host device 20 may read and roll back meta data including the check point CP, the node address table NAT, the segment information table SIT, and the segment summary area SSA that are written in the storage device 100. As illustrated by the clean mark C in FIGS. 5 and 6, since meta data in which log information of the first through sixth data blocks DB1 to DB6 is reflected is written in the storage device 100, the roll-backed meta data may include log information with respect to the first through sixth data blocks DB1 to DB6 and may not include log information with respect to the seventh through tenth data blocks DB7 to DB10. Although the term 'roll-back' is used to emphasize that meta data earlier than the latest meta data can be restored, a technical sprit of the inventive concepts is not limited to the term 'roll-back'. Although sudden power off (SPO) occurs, in the case where the meta data in which the log information of the seventh through tenth data blocks DB7 to DB10 is reflected is written in the storage device 100, the latest meta data may be restored through the roll-back.

In operations S330 to S350, the host device 20 may roll forward meta data. Although the term 'roll-forward' is used to emphasize that meta data later than the meta data restored in the operation S320 can be restored, a technical sprit of the inventive concepts is not limited to the term 'roll-forward'.

In the operation S330, the host device 20 or the file system 21 may detect an active section. The host device 20 or the file system 21 may detect an active section by detecting an active section from roll-backed meta data or scanning the logical storage space LA of the storage device 100. In FIG. 7, the file data section S_FD' and the file node section S_FN' were being used to write data blocks and log blocks before the sudden power off (SPO). Thus, the file data section S_FD' and the file node section S_FN' may be detected as active sections.

In the operation S340, the host device 20 or the file system 21 may detect data blocks without the clean mark C in the active sections S_FN1 or S_FD'. In FIG. 6, the seventh through tenth data blocks DB7 to DB10 do not have the clean mark C. Thus, the seventh through tenth data blocks DB7 to DB10 may be detected.

In the operation S350, the host device 20 or the file system 21 may change pointers associated with the previous logical addresses LBA_O and the logical address LBA. The host device 20 or the file system 21 may release or invalidate a storage space of the previous logical addresses LBA_O associated with the seventh data block DB7 and may update the roll-backed meta data to indicate that the seventh data block DB7 is written in a storage space corresponding to the first offset OFF1 of a section of the logical address LBA. The host device 20 or the file system 21 may release or invalidate storage spaces of the previous logical addresses LBA_O associated with the eighth through tenth data block DB8 to DB10 and may update the roll-backed meta data to indicate that the eighth through tenth data block DB8 to DB10 are written in storage spaces corresponding to the second through fourth offsets OFF2 to OFF4 of a section of the logical address LBA.

When a roll-forward of the operations S330 to S350 is performed, the roll-forwarded meta data indicates that the seventh through tenth data blocks DB7 to DB10 are written in the storage device 100 and thus meta data is normally restored from sudden power off.

According to the embodiments described above, even though the latest meta data is not written in the storage device 100, the latest meta data may be restored through the roll-back and the roll-forward. Thus, the number of times of writing meta data in the storage device 100 may be reduced and an operating speed of the nonvolatile memory device 110 and the storage device 100 is improved and their lifespan is extended.

Figure 8:
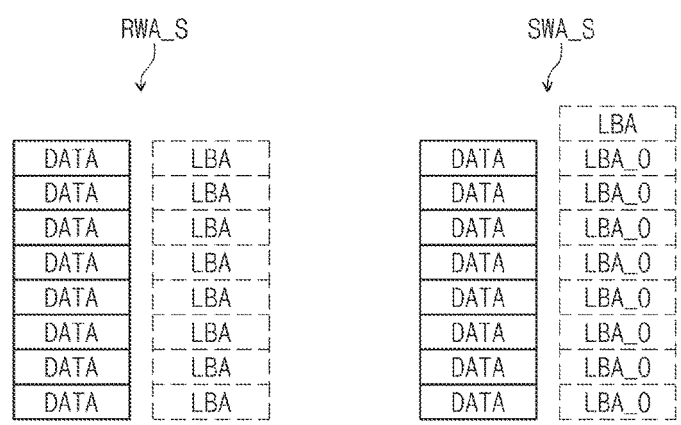
FIG. 8 illustrates an example where data is written in a random write section of a random write area and a sequential write section of a sequential write area.

FIG. 8 illustrates an example where data is written in a random write section RWA_S of a random write area RWA and a sequential write section SWA_S of a sequential write area SWA. Referring to FIGS. 1 and 8, in the random write section RWA_S, data is randomly written in units of blocks regardless of the order of logical addresses LBA. The controller 120 of the storage device 100 is configured to map the logical address LBA of the data block to a physical address (PBA) of the nonvolatile memory device 110. The controller 120 has to manage a relation between the logical address LBA and the physical address (PBA) of each data block. The controller 120 may manage a relation between the logical address LBA and the physical address (PBA) by writing logical address LBA involved together when writing data of each data block in the nonvolatile memory device 110. For example, the logical addresses LBA may be written in the spare area SA.

In the sequential write section SWA_S, data is sequentially written in unit of blocks according to the order of the logical addresses LBA. In the sequential write section SWA_S, blocks being sequentially written may correspond to logical addresses LBA being continuously and sequentially increased (or reduced). The controller 120 may calculate logical addresses of blocks inside the sequential write section SWA_S using only one logical address LBA that belongs to sequential write section SWA_S, for example, the logical address LBA of a beginning or ending block of the sequential write section SWA_S based on a characteristic where the logical addresses LBA of the blocks are continuous in the sequential write section SWA_S. The controller 120 may calculate a logical address of corresponding block based on the logical address LBA inside the sequential write section SWA_S and a location (or order) of the block inside the sequential write section SWA_S.

Since even if only one logical address LBA is written in sequential write section SWA_S, the logical addresses of blocks inside the sequential write section SWA_S can be calculated, a storage space needed to store the logical addresses LBA is reduced. As a storage space needed to store the logical addresses LBA is reduced, a storage space of the spare area SA may be used to store the previous logical addresses LBA_O. Thus, if a sequential write is guaranteed in the sequential write section SWA_S, the overhead caused by storing the previous logical addresses LBA_O according to example embodiments of the inventive concepts may be reduced.

Figure 9:
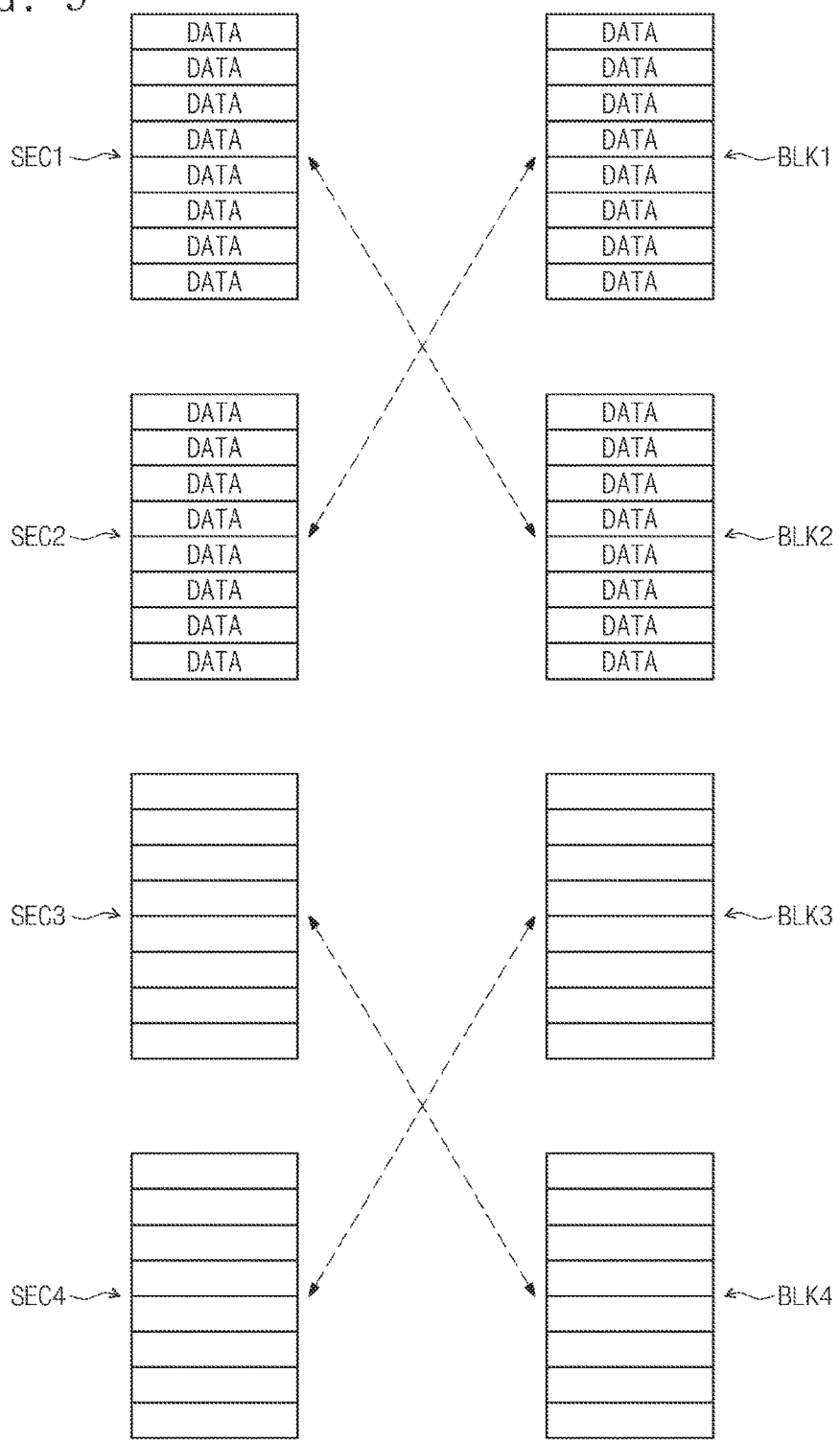
FIGS. 9 through 11 illustrate a relation between sections of a sequential write area and memory blocks of a nonvolatile memory device.
Figure 10:
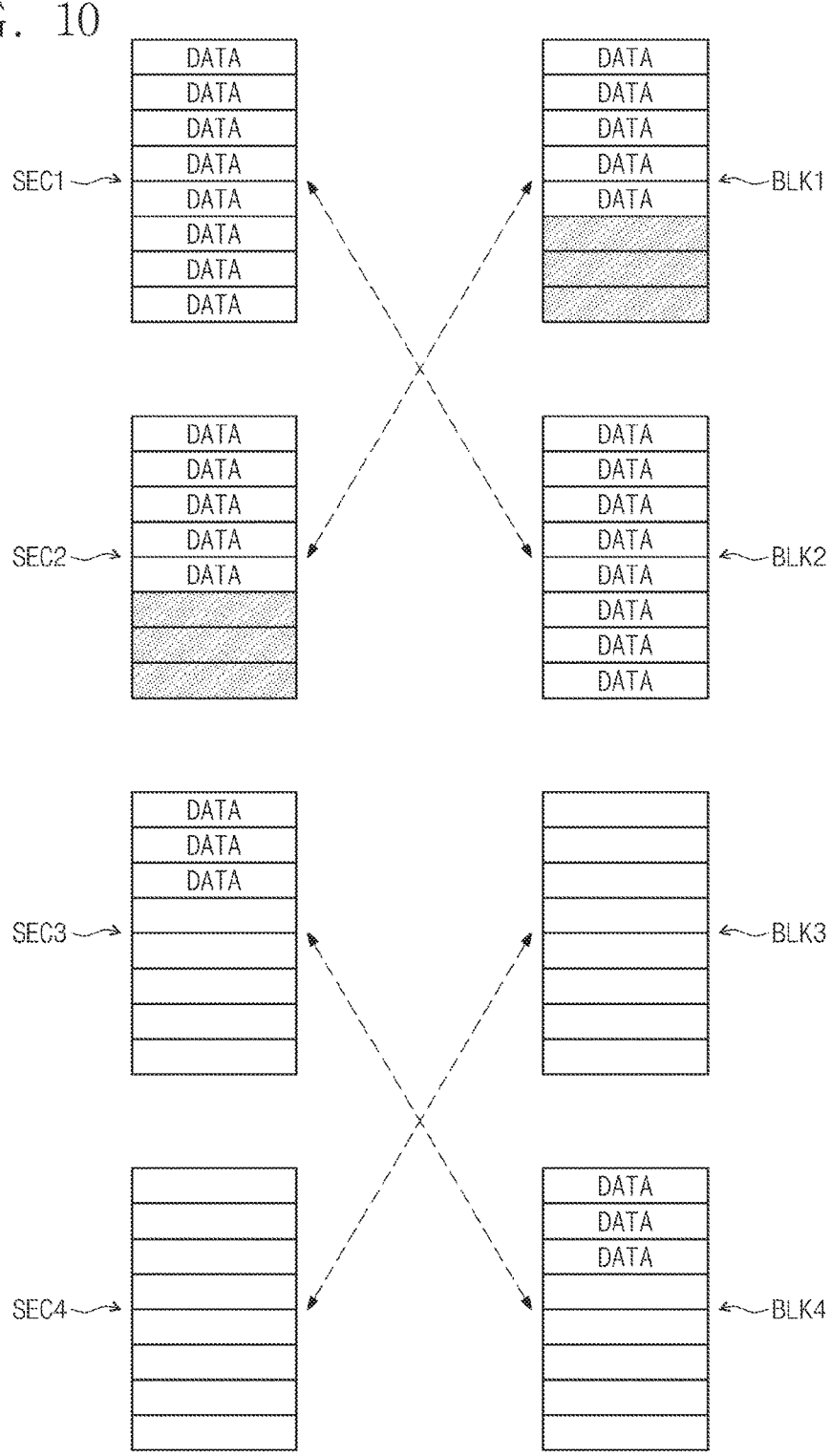
Figure 11:
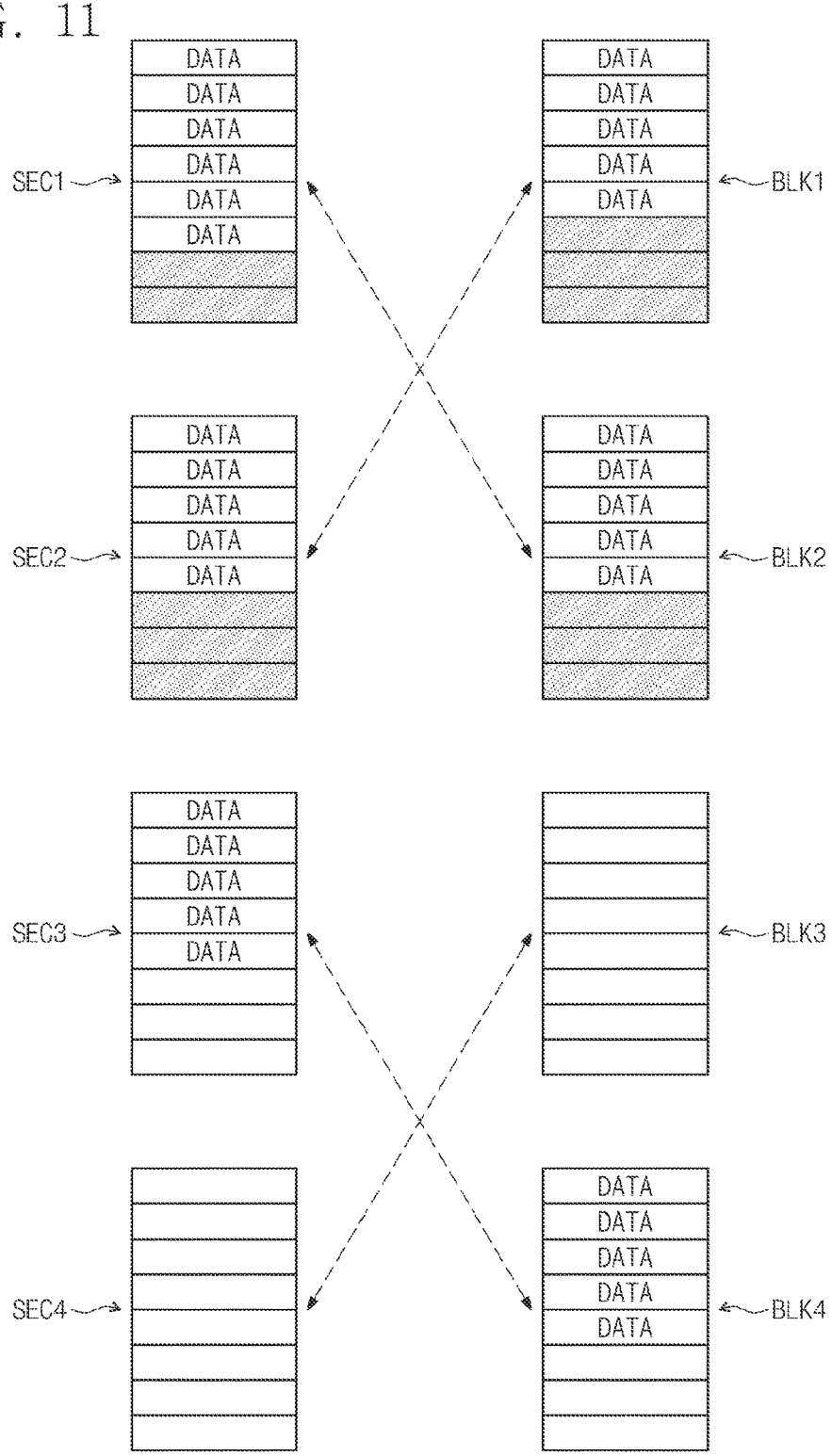

FIGS. 9 through 11 illustrate a relation between sections SEC1 to SEC4 of the sequential write area SWA and the memory blocks BLK1 to BLK4 of the nonvolatile memory device 110. Referring to FIGS. 1 and 9, a size of each section may correspond to a unit of a garbage collection of the nonvolatile memory device 110. In the case where a garbage collection is performed in the nonvolatile memory device 110 to secure a storage space corresponding to a memory block, a unit of the garbage collection may be a memory block. In FIGS. 9 through 11, even though it is assumed that a unit of the garbage collection is a memory block, a unit of the garbage collection in a technical spirit of the inventive concepts is not limited to the memory block.

For brevity of description, an example of a file data section is illustrated in FIGS. 9 through 11 and a file node section is omitted.

The first section SEC1 may correspond to the second memory block BLK2 and data may be written in the first section SEC1. The second section SEC2 may correspond to the first memory block BLK1 and data may be written in the second section SEC2. The third section SEC3 may correspond to the fourth memory block BLK4 and data may not be written in the third section SEC3. The third section SEC3 and the fourth memory block BLK4 may be a free section and a free memory block respectively. The fourth section SEC4 may correspond to the third memory block BLK3 and data may not be written in the fourth section SEC4. The third fourth SEC4 and the third memory block BLK3 may be a free section and a free memory block respectively.

In FIG. 9, it is illustrated that the free section is mapped to the free memory block. However, this is to briefly describe a technical spirit of the present inventive concepts and does not limit the present inventive concept. The mapping of the free section and the free memory block may be generated when the free section is allocated as an active section in the sequential write area SWA.

Referring to FIGS. 1 and 10, the third section SEC3 may be allocated as an active section and data may be sequentially written. As the host device 20 writes data in the third section SEC3, data may be sequentially written in the corresponding fourth memory block BLK4. Data written in the third section SEC3 may be update data of data written in the second section SEC2. As data is written in the third section SEC3, previous data of the second section SEC2 and the first memory block BLK1 may be invalidated.

Referring to FIGS. 1 and 11, data may be sequentially further written in the third section SEC3. As the host device 20 writes data in the third section SEC3, data may be sequentially written in the corresponding fourth memory block BLK4. The data further written in the third section SEC3 may be update data of data written in the first section SEC1. Thus, as data is written in the third section SEC3, the previous data of the first section SEC1 and the second section SEC2 may be invalidated.

Although not described separately in FIGS. 9 through 11, log information corresponding to each data may also be updated in the file node section in the same manner.

As described with reference to FIGS. 9 through 11, the host device 20 or the file system 21 accesses the storage device 100 in a copy-on-write way. This is the same as the method in which the controller 120 accesses the nonvolatile memory device 110. The host device 20 or the file system 21 guarantees a sequential write in the section and this is the same as the method in which the controller 120 guarantees a sequential write in each memory block. Consequently, as illustrated in FIGS. 9 through 11, a distribution of valid data or invalid data in each section identified by the host device 20 and the file system 21 is the same as a distribution of valid data or invalid data in each memory block of the nonvolatile memory device 110. Thus, the host device 20 or the file system 21 may directly request a garbage collection from the storage device 100 based on the distribution of valid data or invalid data in each section.

Figure 12:
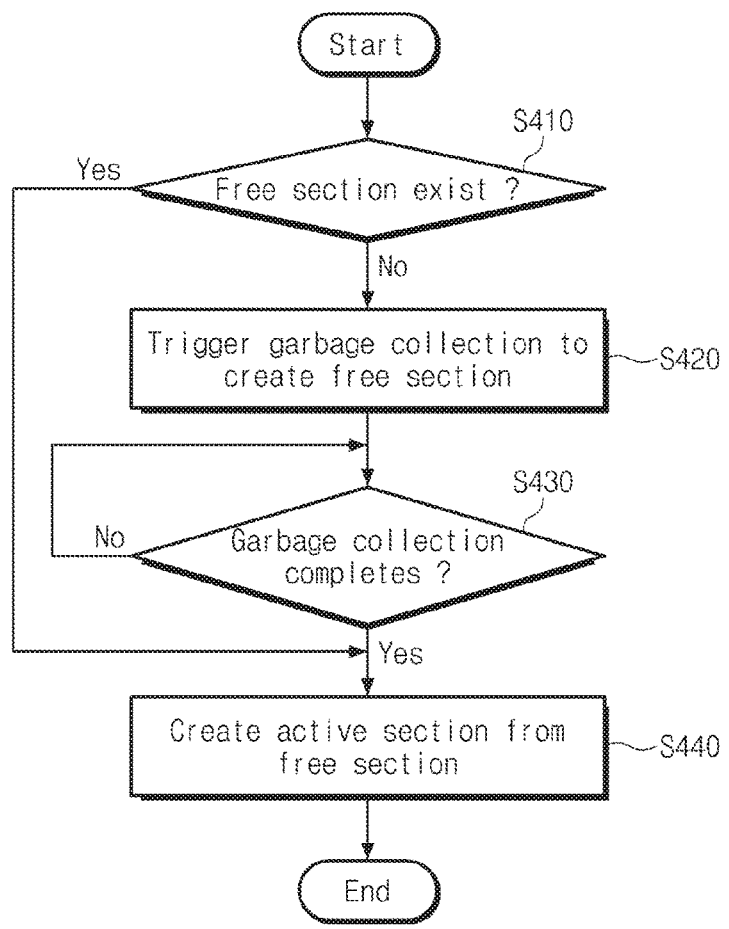
FIG. 12 illustrates an example of a method in which a host device generates an active section.

FIG. 12 illustrates an example of a method in which the host device 20 generates an active section. Referring to FIGS. 1 and 12, in an operation S410, the host device 20 or the file system 21 determines whether a free section exists. When an assignable free section and a free memory block corresponding thereto exist, in an operation S440, the host device 20 and the file system 21 may generate an active section from the free section.

When a free section does not exist, in an operation S420, the host device 20 or the file system 21 may trigger a garbage collection to generate a free section. In an operation S430, the host device 20 or the file system 21 may stand by until a garbage collection is completed.

The host device 20 or the file system 21 may trace the movement of data generated by the garbage collection and a free section generated by the garbage collection by directly transmitting logical addresses of sections to be integrated and a free section to be generated through the garbage collection to the storage device 100. The host device 20 or the file system 21 may trace the movement of data generated by the garbage collection and a free section generated by the garbage collection by receiving information of data moved by the garbage collection and information of a free memory block generated by the garbage collection from the storage device 100. According to a trace result, the host device 20 and the file system 21 may update meta data.

After that, in an operation S440, the host device 20 or the file system 21 may generate an active section from the generated free section.

As described above, the host device 20 or the file system 21 may trace a data distribution of the physical storage area PA of the nonvolatile memory device 110 using data distribution information of the logical storage area LA. Referring to the data distribution, when a free storage space of continuous logical addresses corresponding to a section is insufficient, the host device 20 or the file system 21 may trigger the garbage collection. As the host device 20 or the file system 21 may exchange information with the storage device 100, the host device 20 or the file system 21 may trace an update of meta data that occurs according to performance of the garbage collection. When the host device 20 or the file system 21 is set to directly trigger the garbage collection, the host device 20 or the file system 21 may guarantee a sequential write of a section unit, operation performance of the storage device 100 is improved and lifespan of the storage device 100 may be extended according to a technical spirit of the inventive concept.

Referring to FIG. 1 again, the nonvolatile memory device 110 may write, read, and erase operations under the control of the controller 120. The nonvolatile memory device 110 may receive a command and an address from the controller 120 through an input/output channel. The nonvolatile memory device 110 may exchange data with the controller 120 through the input/output channel.

The nonvolatile memory device 110 may include a flash memory. However, the nonvolatile memory device 110 is not limited to include a flash memory. The nonvolatile memory device 110 may include at least one of various nonvolatile memory devices such as a phase-change RAM (PRAM), a magnetic RAM (MRAM), a resistive RAM (RRAM), a ferroelectric RAM (FRAM), etc.

The controller 120 is configured to control the nonvolatile memory device 110. Through the control channel and the input/output channel, the controller 120 may control the nonvolatile memory device 110 so that the nonvolatile memory device 110 performs a write, read or erase operation.

The controller 120 may control the nonvolatile memory device 110 under the control of the external host device 20. The controller 120 may communicate with the external host device 20 according to a format different from a format through which the controller 120 communicates with the nonvolatile memory device 110. A unit of data in which the controller 120 communicates with the nonvolatile memory device 110 may be different from a unit of data in which the controller 120 communicates with the external host device 20.

Figure 13:
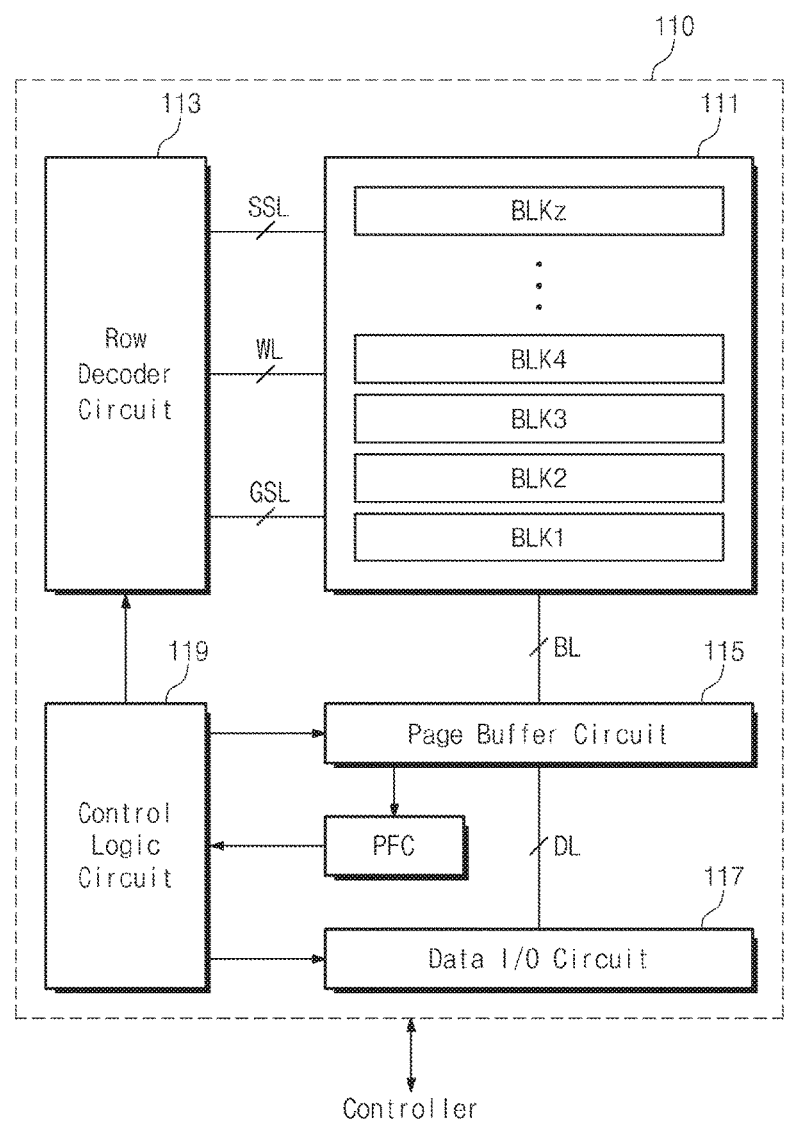
FIG. 13 is a block diagram illustrating a nonvolatile memory device according to example embodiments of the inventive concept.

FIG. 13 is a block diagram illustrating the nonvolatile memory device 110 according to example embodiments of the inventive concept. Referring to FIGS. 1 and 13, the nonvolatile memory device 110 includes a memory cell array 111, a row decoder circuit 113, a page buffer circuit 115, a pass-fail check circuit PFC, a data input/output circuit 117, and a control logic circuit 119.

The memory cell array 111 includes a plurality of memory blocks BLK1 to BLKz. Each memory block includes a plurality of memory cells. Each memory block may be connected to the row decoder circuit 113 through at least one ground select line GSL, a plurality of word lines WL, and at least one string select line SSL. Each memory block may be connected to the buffer circuit 115 through a plurality of bit line BL. The plurality of memory blocks BLK1 to BLKz may be connected to the plurality of bit lines BL in common. Memory cells of the plurality of memory blocks BLK1 to BLKz may have the same structure.

Each of the plurality of memory blocks BLK1 to BLKz may be a unit of an erase operation. Memory cells of the memory cell array 111 may be erased in units of memory blocks. Memory cells that belong to one memory block may be erased at the same time. Alternatively, each memory block may be divided as a plurality of sub blocks. Each sub block may be a unit of an erase operation.

Each of the plurality of memory blocks BLK1 to BLKz may include a physical storage space identified by a block address. Each of the word lines WL may correspond to a physical storage space identified by a row address. Each of the bit lines BL may correspond to a physical storage space identified by a column address.

The row decoder circuit 113 is connected to the memory cell array 111 through the plurality of ground select lines GSL, the plurality of word lines WL, and the plurality of string select lines SSL. The row decoder circuit 113 operates according to a control of the control logic circuit 119. The row decoder circuit 113 may decode an address being received from the controller 120 through an input/output channel and may control voltages being applied to the string select lines SSL, the word lines WL, and the ground select lines GSL according to the decoded address.

In a program operation, the row decoder circuit 113 may apply a program voltage to a selected word line of a memory block selected by an address and may apply a pass voltage to unselected word lines of the selected memory block. In a read operation, the row decoder circuit 113 may apply a select read voltage to a selected word line of a memory block selected by an address and may apply an unselect read voltage to unselected word lines of the selected memory block. In an erase operation, the row decoder circuit 113 may apply erase voltages (e.g., a ground voltage or low voltages having levels similar to the ground voltage) to word lines of a memory block selected by an address.

The page buffer circuit 115 may be connected to the memory cell array 111 through the plurality of bit lines BL. The page buffer circuit 115 is connected to the data input/output circuit 117 through a plurality of data lines DL. The page buffer circuit 115 operates under the control of the control logic circuit 119.

In a program operation, the page buffer circuit 115 may store data to be programmed in memory cells. The page buffer circuit 115 may apply voltages to the plurality of bit lines BL based on the stored data. The page buffer circuit 115 may function as a write driver. In a read operation or a verification read operation, the page buffer circuit 115 may sense voltages of the bit lines BL and may store a sensing result. The page buffer circuit 115 may function as a sense amplifier.

The pass-fail check circuit PFC may receive a sensing result from the page buffer circuit 115 after the verification read operation. The pass-fail check circuit PFC may determine whether a program passes or fails based on the received sensing result. In a program verification read operation, the pass-fail check circuit PFC may count the number of on-cells being turned on. When the number of on-cells is greater than a threshold value, the pass-fail check circuit PFC may determine that a program fails. When the number of on-cells is smaller than the threshold value, the pass-fail check circuit PFC may determine that a program passes. In an erase operation, the page buffer circuit 115 may count the number of off-cells being turned off. When the number of off-cells is greater than the threshold value, the pass-fail check circuit PFC may determine that a program fails. When the number of off-cells is smaller than the threshold value, the pass-fail check circuit PFC may determine that a program passes. A determination result of pass or fail may be transmitted to the control logic circuit 119.

The data input/output circuit 117 is connected to the page buffer circuit 115 through the plurality of data lines DL. The data input/output circuit 117 may output data read by the page buffer circuit 115 to the controller 120 through the input/output channel and may transmit data being received from the controller 120 through the input/output channel to the page buffer circuit 115.

The control logic circuit 119 may receive a command from the controller 120 through the input/output channel and may receive a control signal from the controller 120 through a control channel. The control logic circuit 119 may receive a command being received through the input/output channel in response to the control signal, may route an address being received through the input/output channel to the row decoder circuit 113, and may route data being received through the input/output channel to the data input/output circuit 117. The control logic circuit 119 may decode the received command and may control the nonvolatile memory device 110 according to the decoded command.

FIG. 14 is a circuit diagram illustrating a memory block BLKa according to example embodiments of the inventive concept. Referring to FIG. 14, a memory block BLKa includes a plurality of cell strings CS11, CS21, CS12, and CS22. The cell strings CS11, CS21, CS12, and CS22 may be arranged along a row direction and a column direction to form rows and columns.

The cell strings (CS11, CS12) arranged along the row direction may form a first row and the cell strings (CS21, CS22) arranged along the row direction may form a second row. The cell strings (CS11, CS21) arranged along the column direction may form a first column and the cell strings (CS12, CS22) arranged along the column direction may form a second column.

Each cell string may include a plurality of transistors. The cell transistors include ground select transistors GST, memory cells MC1 to MC6, and string select transistors (SSTa, SSTb). The ground select transistor GST, the memory cells MC1 to MC6 and string select transistors (SSTa, SSTb) of each cell string may be laminated in a height direction perpendicular to a plane (e.g., a plane on a substrate of the memory block BLKa) on which the cell strings CS11, CS21, CS12, CS22 are arranged along rows and columns.

The cell transistors may be charge trap type transistors having threshold voltages that vary depending on the amounts of charges trapped in an insulating layer.

Sources of the lowermost ground select transistors GST may be connected to a common source line CSL in common.

Control gates of the ground select transistors GST of the cell strings (CS11, CS12) of the first row are connected to a ground select line GSL1 in common and control gates of the ground select transistors GST of the cell strings (CS21, CS22) of the second row are connected to a ground select line GSL2 in common. That is, cell strings of different rows are connected to different ground select lines.

Control gates of memory cells located at the same height (or order) from the substrate (or ground select transistors GST) may be connected to one word line in common, and control gates of memory cells located at different heights (or orders) from the substrate (or ground select transistors GST) may be connected to different word lines WL1 to WL6 respectively. For example, the memory cells MC1 are connected to the word line WL1 in common. The memory cells MC2 are connected to the word line WL2 in common. The memory cells MC3 are connected to the word line WL3 in common. The memory cells MC4 are connected to the word line WL4 in common. The memory cells MC5 are connected to the word line WL5 in common. The memory cells MC6 are connected to the word line WL6 in common.

At first string select transistors SSTa of the same height (or order) of the cell strings CS11, CS21, CS12 and CS22, control gates of the first string select transistors SSTa of different rows are connected to different string select lines SSL1a and SSL2a respectively. For example, the first string select transistors SSTa of the cell strings CS11 and CS12 are connected to the string select line SSL1a in common. The first string select transistors SSTa of the cell strings CS21 and CS22 are connected to the string select line SSL2a in common.

At second string select transistors SSTb of the same height (or order) of the cell strings CS11, CS21, CS12, CS22, control gates of the second string select transistors SSTb of different rows are connected to different string select lines SSL1b and SSL2b respectively. For example, the second string select transistors SSTb of the cell strings CS11 and CS12 are connected to the string select line SSL1b in common. The second string select transistors SSTb of the cell strings CS21 and CS22 are connected to the string select line SSL2b in common.

That is, cell strings of different rows are connected to different string select lines. String select transistors of the same height (or order) of cell strings of the same row are connected to the same string select line. String select transistors of different heights (or orders) of cell strings of the same row are connected to different string select lines.

String select transistors of cell strings of the same row may be connected to one string select line in common. For example, the string select transistors SSTa and SSTb of the cell strings CS11 and CS12 of the first row may be connected to one string select line in common. The string select transistors SSTa and SSTb of the cell strings CS21 and CS22 of the second row may be connected to one string select line in common.

Columns of the cell strings CS11, CS21, CS12, and CS22 are connected to different bit lines BL1 and BL2 respectively. For example, the string select transistors SSTb of the cell strings CS11 and CS21 of the first column are connected to the bit line BL1 in common. The string select transistors SSTb of the cell strings CS12 and CS22 of the second column are connected to the bit line BL2 in common.

In the memory block BLKa, memory cells located at the same height from the substrate may be characterized by sharing a word line. In other memory blocks, word lines may be characterized by not being shared. For example, a memory cell of a first height of a first memory block can share a word line with other memory cells of the first height of the first memory block. The memory cell of the first height of the first memory block may not share a word line with a memory cell of the first height of a second memory block. A sub block may be characterized by a part of the memory block BLKa.

MC1 to MC6MC1 to MC6MC1 to MC6MC1 to MC6MC1 to MC6MC1 to MC6MC1 to MC6MC1 to MC6MC1 to MC6MC1 to MC6 The memory block BLKa illustrated in FIG. 14 is illustrative. A technical spirit of the inventive concepts is not limited to the memory block BLKa illustrated in FIG. 2. For example, the number of rows of cell strings may increase or decrease. As the number of rows of cell strings changes, the number of string select lines or ground select lines connected to rows of the cell strings, and the number of cell strings connected to one bit line may also be changed.

The number of columns of cell strings may increase or decrease. As the number of columns of cell strings changes, the number of bit lines connected to columns of the cell strings, and the number of cell strings connected to one string select line may also be changed.

A height of the cell strings may increase or decrease. For example, the number of ground select transistors, memory cells or string select transistors that are laminated to each of the cell string may increase or decrease.

Memory cells that belong to one physical page may correspond to at least three logical pages. For example, k (k is a positive integer greater than 2) number of bits may be programmed in one memory cell. In the memory cells that belong to one physical page, k number of bits being programmed in each memory cell may form k number of logical pages respectively.

As described above, the memory block BLKa is provided as a three dimensional (3D) memory array. The 3D memory array is monolithically formed in one or more physical levels of arrays of memory cells MC1 to MC6 having an active area disposed above a silicon substrate and circuitry associated with the operation of those memory cells MC1 to MC6, whether such associated circuitry is above or within such substrate. The term "monolithic" means that layers of each level of the array are directly deposited on the layers of each underlying level of the array.

In an embodiment of the present inventive concept, the 3D memory array includes vertical NAND strings that are vertically oriented such that at least one memory cell is located over another memory cell. The at least one memory cell may comprise a charge trap layer. Each vertical NAND string may include at least one select transistor located over memory cells MC1 to MC6, the at least one select transistor having the same structure with the memory cells MC1 to MC6 and being formed monolithically together with the memory cells MC1 to MC6.

The following patent documents, which are hereby incorporated by reference, describe suitable configurations for three-dimensional memory arrays, in which the three-dimensional memory array is configured as a plurality of levels, which word lines and/or bit lines shared between levels: U.S. Pat. Nos. 7,679,133; 8,553,466; 8,654,587; 8,559,235; and US Pat. Pub. No. 2011/0233648.

In the memory block BLKa, a unit of a garbage collection may be the memory block BLKa or a sub block. One memory block BLKa may include a plurality of sub blocks. Sub blocks may be generated by dividing the memory cells MC1 to MC6 along a direction perpendicular to the substrate. Sub blocks may be generated by dividing the memory cells MC1 to MC6 of the memory block BLKa along a direction in which the bit lines (BL1, BL2) extend.

Alternatively, a unit of the garbage collection may be two or more memory blocks. A unit of the garbage collection may also be a set of sub blocks that belong to two or more memory blocks.

Figure 15:
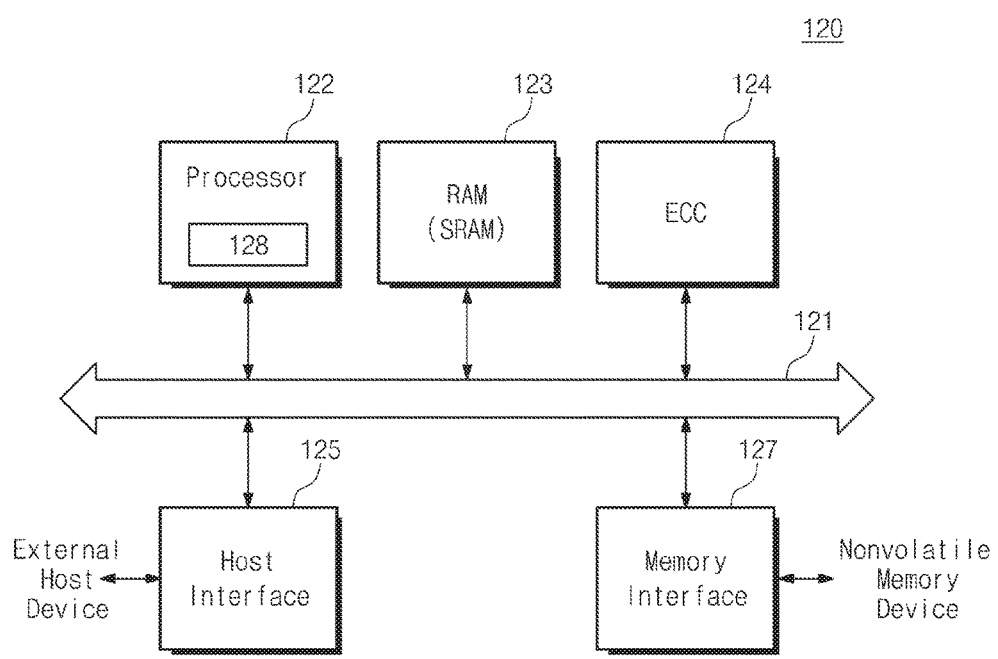
FIG. 15 is a circuit diagram illustrating a controller according to example embodiments of the inventive concept.

FIG. 15 is a circuit diagram illustrating the controller 120 according to example embodiments of the inventive concept. Referring to FIGS. 1 and 15, the controller 120 includes a bus 121, a processor 122, a RAM 123, an error correction block 124, a host interface 125, and a memory interface 127.

The bus 121 is configured to provide a channel between constituent elements of the controller 120.

The processor 122 may control an overall operation of the controller 120 and perform a logical operation. The processor 122 may communicate with an external host device through the host interface 125 and communicate with the nonvolatile memory device 110 through the memory interface 127. The processor 122 may control the storage device 100 using the RAM 123 as an operating memory, a cache memory, or a buffer memory.

The RAM 123 may be used as an operating memory, a cache memory, or a buffer memory. The RAM 123 may store codes and commands executed by the processor 122. The RAM 123 may store data processed by the processor 122. The RAM 123 may include a static RAM (SRAM).

The error correction block 124 may perform an error correction. The error correction block 124 may perform an error correction encoding based on data to be written in the nonvolatile memory device 110 through the memory interface 127. Error correction encoded data may be transmitted to the nonvolatile memory device 110 through the memory interface 127. The error correction block 124 may perform an error correction decoding with respect to data received from the nonvolatile memory device 110 through the memory interface 127. The error correction block 124 may be included in the memory interface 127 as a constituent element of the memory interface 127.

The host interface 125 is configured to communicate with the external host device according to a control of the processor 122. The host interface 125 may be configured to perform a communication using at least one of various communication methods such as a USB (universal serial bus), a SATA (serial AT attachment), a SAS (serial attachment SCSI), a HSIC (high speed interchip), a SCSI (small computer system interface), a PCI (peripheral component interconnection), a PCIe (PCI express), a NVMe (nonvolatile memory express), a UFS (universal flash storage), a SD (secure digital), a MMC (multimedia card), an eMMC (embedded MMC), a DIMM (dual in-line memory module), a RDIMM (registered DIMM), a LRDIMM (load reduced DIMM), etc.

The memory interface 127 is configured to communicate with the nonvolatile memory device 110 according to a control of the processor 122. As described with reference to FIG. 1, the memory interface 127 may communicate a command, an address, and data to the nonvolatile memory device 110 through the input/output channel. The memory interface 127 may communicate a control signal to the nonvolatile memory device 110 through the control channel.

The processor 122 may control the controller 120 using codes. The processor 122 may load codes from the nonvolatile memory device (e.g., read only memory) provided inside the controller 120. The processor 122 may load codes from the nonvolatile memory device 110 through the memory interface 127.

The bus 121 of the controller 120 may be classified as a control bus or a data bus. The data bus may be configured to transmit data inside the controller 120 and the control bus may be configured to transmit control information such as a command, an address, etc. The data bus and the control bus may be separated from each other and may not interfere with or not affect each other. The data bus may be connected to the host interface 125, the error correction block 124, and the memory interface 127. The control bus may be connected to the host interface 125, the processor 122, the RAM 123, and the memory interface 127.

According to example embodiments of the inventive concept, meta data associated with update data may be written in a storage device together with the update data and may be used to restore a file system after sudden power off. Thus, the number of times that the meta data is written in the storage device is reduced and thus a speed of accessing the storage device and lifespan of the storage device are improved.

The above-disclosed subject matter is to be considered illustrative, and not restrictive, and the appended claims are intended to cover all such modifications, enhancements, and other embodiments, which fall within the true spirit and scope of the inventive concept. Thus, to the maximum extent allowed by law, the scope of the inventive concepts is to be determined by the broadest permissible interpretation of the following claims and their equivalents, and shall not be restricted or limited by the foregoing detailed description.

What is claimed is:

1. A method of accessing a storage device including a nonvolatile memory device and a controller comprising:
   writing, in the nonvolatile memory device, (i) user data, (ii) a first logical address pointing to the user data, and (iii) a second logical address pointing to the user data, in a storage space pointed to by the first logical address of the nonvolatile memory device
   wherein the user data is update data that updates previous data written in the nonvolatile memory device, and
   wherein the second logical address is a logical address of the storage space of the nonvolatile memory device in which the previous data is written,
   wherein the writing user data includes,
      writing the user data into the storage space corresponding to the first logical address, and
      writing the first logical address and the second logical address into a second storage space of the nonvolatile memory device corresponding to a third logical address.

2. The method of claim 1, further comprising:
   detecting that sudden power off occurred in the storage device; and
   in response to the detection, restoring a file system that manages the storage device based on the first logical address and the second logical address that are written in the nonvolatile memory device.

3. The method of claim 2 further comprising:
   writing meta data associated with second user data written in the nonvolatile memory device before the writing user data, the first logical address, and the second logical address associated with the user data.

4. The method of claim 3, wherein the restoring the file system includes
   rolling back the file system based on the meta data written in the nonvolatile memory device, and
   after the rolling back the file system, rolling forward the file system based on the first logical address and the second logical address that are written in the nonvolatile memory device.

5. The method of claim 4, wherein the rolling forward the file system includes:
   after the rolling back the file system, invalidating information associated with the second logical address in the file system, and
   adding information associated with the first logical address in the file system.

6. The method of claim 1, further comprising:
   writing first meta data into the nonvolatile memory device, the first meta data being updated according to the writing user data.

7. The method of claim 6, further comprising:
   detecting that sudden power off occurred in the storage device; and
   in response to the detection, restoring a file system that manages the storage device based on the meta data.

8. The method of claim 6, further comprising:
   writing information into a storage space associated with the user data in the nonvolatile memory device, the information indicating that the updated meta data was written into the nonvolatile memory device.

9. The method of claim 1, further comprising:
   allocating a continuous storage space corresponding to continuous logical addresses in the nonvolatile memory device; and
   selecting a logical address of a first free storage space as the first logical address in an order from a lowest logical address in the continuous storage space to a highest logical address in the continuous storage space.

10. The method of claim 9, wherein the continuous storage space is the same as a size of a second storage space obtained through a garbage collection in the nonvolatile memory device.

11. The method of claim 10, wherein the controller performs a block mapping that associates the continuous logical addresses of the continuous storage space with continuous physical addresses of the second storage space respectively.

12. The method of claim 9, wherein the writing user data, a first logical address and a second logical address associated with the user data includes
   writing the first logical address in the continuous storage space once, and
   writing the second logical address in the continuous storage space several times.

13. The method of claim 9, further comprising requesting the controller to perform a garbage collection in the nonvolatile memory device when a free storage space in logical addresses of the nonvolatile memory device is not continuous as much as a size of the continuous storage space.

14. A method of accessing a storage device comprising:
   allocating, by a host device, a continuous storage space corresponding to continuous logical addresses in the storage device;
   sequentially writing, by the host device, (i) user data in the continuous storage space in an order of the continuous logical addresses together with (ii) a first logical address pointing to the continuous storage space and (iii) second logical addresses pointing to physical addresses in which the user data is previously written; and
   in response to a sudden power off of the storage device being detected, restoring, by the host device, a file system using meta data backed up in the storage device, and the first and second logical addresses,
   wherein sequentially writing, by the host device, (i) user data in the continuous storage space in an order of the continuous logical addresses together with (ii) a first logical address pointing to the continuous storage space and (iii) second logical addresses pointing to physical addresses in which the user data is previously written includes,
      writing the user data into the continuous storage space corresponding to the first logical address, and
      writing the first logical address and the second logical address into a second storage space of the storage device corresponding to a third logical address.

15. A method of accessing a storage device including a nonvolatile memory device and a controller comprising:
   detecting a sudden power-off event of the storage device; and
   rolling forward a file system based on a first logical address and a second logical address,
   wherein the first logical address is a logical address pointing to a physical address containing (i) user data in a storage space pointed to by the first logical address of the nonvolatile memory device, (ii) the first logical address, and (iii) the second logical address, and wherein
   the second logical address is a logical address of the storage space of the nonvolatile memory device in which a previous data is written.

16. The method of claim 15, wherein the detecting the sudden power-off event includes writing, in a designated location, an information indicating that the sudden power off event is occurring, using internal standby power.

17. The method of claim 15, wherein the detecting the sudden power-off event includes writing, in a designated location, information indicating that a normal power off event has occurred only when a normal power off occurs, and detecting, by a host device, that the information is not present.

18. The method of claim 15, further comprising:

rolling back the file system based on a meta data written in the nonvolatile memory device.

* * * * *